June 9, 1959     F. C. HUYSER     2,889,706
STRESS-STRAIN MEASURING APPARATUS
Filed Feb. 6, 1956
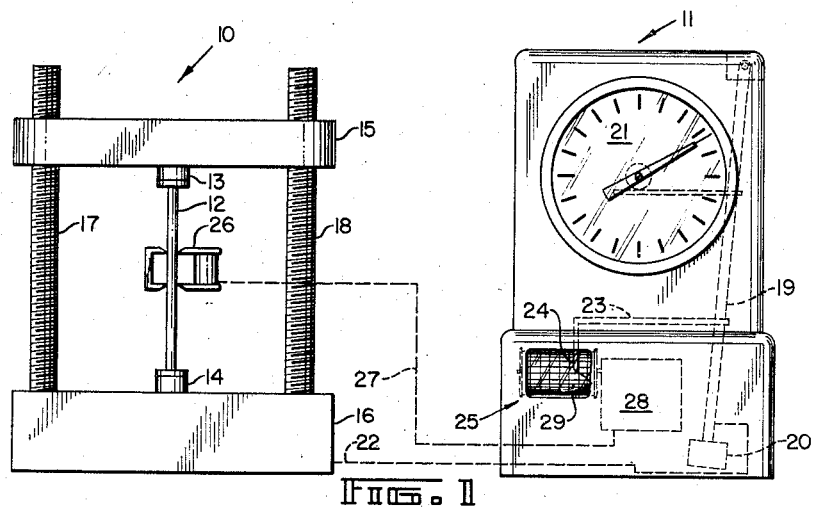
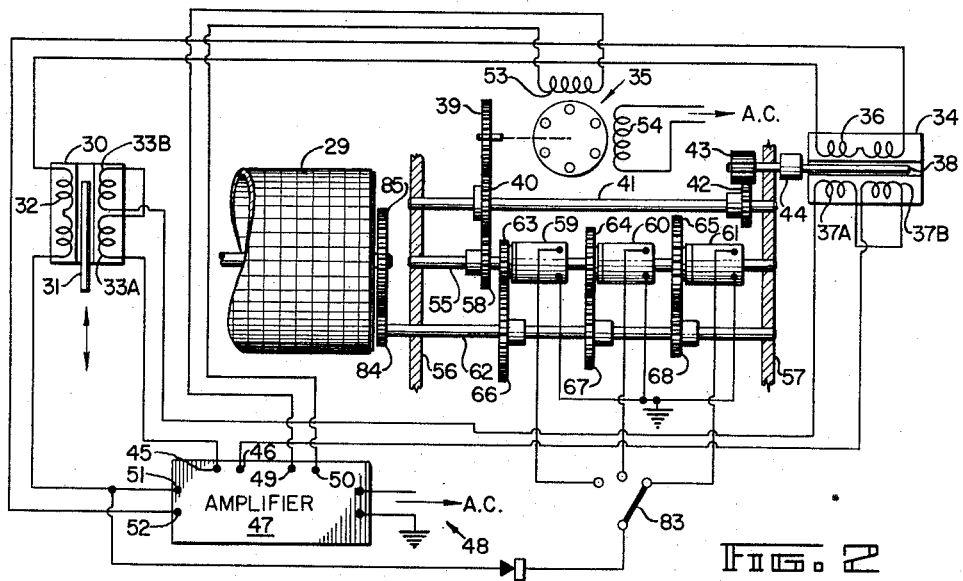
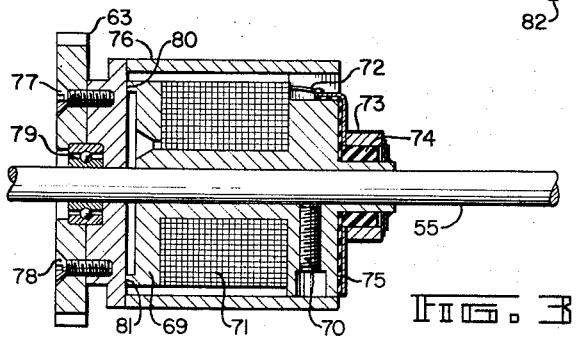
INVENTOR.
FRANCIS C. HUYSER
BY
Pollard, Johnston, Smythe & Robertson
ATTORNEYS.

United States Patent Office 2,889,706
Patented June 9, 1959

2,889,706

STRESS-STRAIN MEASURING APPARATUS

Francis C. Huyser, Moline, Ill., assignor to American Machine and Metals, Inc., New York, N.Y., a corporation of Delaware Application February 6, 1956, Serial No. 563,682

2 Claims. (Cl. 73—89)

This invention relates to stress-strain recording apparatus and more particularly to stress-strain recording apparatus embodying improved strain magnification controlling means.

In determining the mechanical properties of materials, very important information is secured by performing so-called "stress-strain" tests which indicate the relation between the load applied to a test specimen and the resulting deformation of the specimen. Such tests may include the application of tensile or compressive stress on the test specimen and measurement of the resulting strain produced therein. One means of performing these tests is the use of universal testing machines which fundamentally comprise a compression table and one or more crosshead members which are movable with respect to the table and each other. When a compressive stress is to be exerted on the test specimen, it is usually placed between the lower crosshead member and the compression table, while the exertion of a tensile stress requires the specimen to be placed between the upper and lower crosshead members. The movable crosshead member to which the specimen is affixed is moved in relation to the compression table and the other crosshead member by a so-called "loading unit" which may be mechanical or hydraulic in operation.

In order to provide a visual indication and record of the test, stress-strain recording apparatus is customarily employed in conjunction with the universal testing machine. This apparatus may comprise a rotatable drum and a stylus which is movable transversely along the face of the drum to produce a stress-strain diagram on a chart secured to the drum. The stylus is connected to the loading unit so that its movement is in response to the load or stress applied to the specimen. Conventional mechanical or hydraulic connecting means may be used for this purpose. The drum is connected to a strain responsive means affixed to the test specimen so that its rotation is proportional to the strain produced in the specimen. The strain responsive means, usually referred to as a "strain following instrument," may comprise an extensometer or compressometer of conventional types which measure elongation and compression, respectively. For certain materials and certain portions of the stress-strain diagram, the change in strain becomes very much larger than the change in applied stress. This is especially true in very ductile materials such as steel which is stressed pased the yield point. For this reason, the same strain following instrument that is used below the yield point is often not satisfactory for use above the yield point. It is therefore customary to employ several strain following instruments during the course of a particular test to obtain the most accurate results.

When this is done, however, it usually requires that an adjustment be made in the strain magnification of the system which translates the information obtained from the strain following instrument into mechanical rotation of the drum so that a correct stress-strain diagram is obtained. Similarly, it is often desired to change the strain magnification for certain portions of the stress-strain diagram where an amplified diagram is of value in interpreting the test results so that the degree of movement of the drum in response to a given change in strain may be varied.

Accordingly, it is an object of this invention to provide stress-strain recording apparatus which embodies novel strain magnification controlling means that permit of easy adjustment of the strain magnification during the course of a test.

A further object of this invention is the provision of stress-strain recording apparatus embodying strain magnification controlling means that are extremely accurate and reliable in operation and permit of easy manipulation by the test operator.

In conventional stress-strain recording apparatus, the output from the strain responsive means is transmitted to the chart holding drum by signal transmitting means which may comprise a direct mechanical linkage or an electromechanical device such as a follow-up system. According to the invention, strain magnification controlling means are connected between the signal transmitting means and the drum to vary the degree of movement of the drum in response to a given change in the output from the strain responsive means. The strain magnification controlling means include a plurality of selectively actuable electromagnetically operated motion transmitting means, each having a different motion transmission ratio, which are connected between the output of the signal transmitting means and the drum. In the illustrated form of the invention, the motion transmitting means take the form of electromagnetically operated clutches and associated gear trains having different gear ratios. Selector means, in the form of a switch, is provided to permit only one clutch to be operated at a time, thus effectively controlling the strain magnification.

These and other objects, advantages and features of the invention, will become apparent from the following description and drawings which are merely exemplary.

In the drawings:

Fig. 1 is a schematic diagram of a universal testing machine and associated stress-strain recording apparatus;

Fig. 2 is a diagram showing the signal transmitting means and strain magnification controlling means as connected to the drum member of the recorder unit; and Fig. 3 is a sectional view of one of the clutches employed in the strain magnification controlling means.

Referring first to Fig. 1 of the drawing, there is shown schematically a universal testing machine 10 and associated stress-strain recording unit 11. Such universal testing machines, as represented schematically herein, are capable of exerting a tensile or compressive stress on test specimens, such as that depicted at 12. The specimen illustrated is held in grips 13 and 14 which are affixed to the crosshead 15 and table 16 of the machine. A loading unit (not shown) may be hydraulic or mechanical in operation and is capable of rotating screws 17 and 18 to raise and lower the crosshead relative to the table, thus stressing the test specimen 12.

The illustrated recording apparatus 11 utilizes a pendulum-type of indicating unit for the stress indications and consists of pendulum shaft 19, pendulum 20 and indicator unit 21. As indicated schematically, a linkage 22 of any suitable type may be provided between the loading unit on the testing machine and the recording unit 11, such that the pendulum 20 is laterally displaced in response to changes in the applied stress. As the pendulum is displaced, a visual indication of the stress is provided by indicator 21. At the same time, a linkage 23 connects the pendulum shaft 19 with a movable stylus 24 on a recording unit indicated generally at 25. By this means, variations in stress are translated into lateral movements of the stylus 24.

To provide an indication of the strain in the test specimen resulting from the applied stress, a strain following instrument 26 of any conventional type is affixed to the test specimen 12 and provides a signal which may be mechanical or electrical in nature and which is proportional to the strain being measured. Strain following instruments suitable for this use may include extensometers and compressometers depending upon whether a tensile or compressive stress is applied to the test specimen. The output signal from the strain following instrument 26 is transmitted to the input of strain magnification controlling means 28 by signal transmitting means indicated schematically as 27. The signal transmitting means may comprise a direct mechanical linkage or an electromechanical or hydraulic follow-up system of any suitable type. The output from the strain magnification controlling means 28 is applied to rotate a chart-holding drum 29 which comprises the other member of recording unit 25. As the signal produced by the strain following instrument 26 varies with the resultant strain in the test specimen, the chart-holding drum 29 is rotated proportionally thereto. Accordingly, the stylus position with respect to the drum presents an indication of the applied stress, while the rotational movement of the drum with respect to the stylus provides an indication of the resulting strain, thus producing a conventional stress-strain diagram on the surface of the drum 29.

As the invention is concerned primarily with the strain recording portion of the apparatus and the remainder of the apparatus illustrated in Fig. 1 is of a conventional nature, a detailed explanation of the construction and operation of the strain recording portion only of the recording apparatus 11 will now be made. As may best be seen in Fig. 2 of the drawing, a differential transformer 30 has its movable core portion 31 connected for actuation by the mechanical output signal of the strain following instrument 26. The differential transformer 30 further includes a primary winding 32 and a pair of opposed secondary windings 33A and 33B. Such transformers of the differential type are well-known and operate on the principle of varying the coupling between the primary and secondary windings by movement of the core 31. Since the secondary windings are opposed, if the coupling between the primary and secondary windings is uniform, no output signal will appear across them, whereas displacement of the core from a central position produces a greater coupling between one of the secondary windings and the primary winding, thus producing an output signal across the secondary windings. A similarly constructed differential transformer 34 constitutes the follow-up or rebalancing signal generator and is arranged to be actuated by motor means 35 which may comprise any suitable motor including the two-phase motor illustrated. The differential transformer 34 has a primary winding 36 and a pair of opposed secondary windings 37A and 37B. The movable core 38 is actuated by motor 35 through a gear train comprising gear 39, gear 40, shaft 41, gear 42, gear 43 and a motion conversion device 44 which may be of any conventional type used to convert rotary motion into translatory motion. For example, the motion conversion device 44 may comprise a nut held against rotation but capable of translatory motion which is connected to the core 38, and a screw which is rotated by the gear 43. As any number of conventional conversion devices may be utilized, a detailed description thereof will not be provided herein for the sake of simplicity.

The secondary or output windings 33 and 37 of the differential transformers 30 and 34 are connected in series with the input terminals 45 and 46 of a conventional A.C. servo-amplifier 47 of any suitable type. The amplifier is energized from an alternating current source 48 and provides an output signal at terminals 49 and 50. As indicated schematically, amplifier 47 may also house an A.C. power supply having terminals at 51 and 52 which supplies the primary windings 32 and 36 of transformers 30 and 34, respectively. The output signal from the amplifier is fed to the variable phase winding 53 of the two-phase motor 35 for control thereof. The fixed phase winding 54 of the motor may be connected to any suitable A.C. source which, for example, may be the same as source 48 associated with amplifier 47. As is conventional, the 90° phase difference between the windings 53 and 54 of the motor may be provided by the use of a separate condenser in the motor winding or by the amplifier itself.

The follow-up system thus far described is conventional in construction and operates as follows. Movement of the core 31 of the transformer 30 produces an A.C. output signal which is amplified by amplifier 47 and drives motor 35. As the motor rotates, it varies the position of core 38 in transformer 34 in a direction which produces an output signal from the transformer 34 of such phase and magnitude as to oppose that produced by transformer 30. Thus, the series input circuit to the amplifier 47 is balanced and the motor 35 stops running. As is apparent, the position of the shaft of motor 35 will bear a proportionate relation to the position of core 31 and hence is indicative of the strain produced in the test specimen 12.

It will be noted from an inspection of Fig. 1 that the output from the signal transmitting means is connected to the chart-holding drum through strain magnification controlling means 28. The function of this device is to vary the degree of movement of drum 29 in response to a given change in the output from strain responsive means 26. To accomplish this function, the shaft of motor 35 is arranged to rotate shaft 41 through gears 39 and 40. A second shaft 55 is arranged to be supported by support means 56 and 57 which also provide suitable bearing surfaces for the shaft rotation. Shaft 41 is also supported by the support means 56 and 57. A gear 58 mounted on shaft 55 meshes with gear 40 so that shaft 55 is rotated in response to rotation of the shaft of motor 35. A plurality of electromagnetically operated clutches 59, 60 and 61 have their input members affixed to shaft 55, while their output members are arranged to drive a shaft 62 through gears 63, 64, 65, 66, 67 and 68.

As may best be seen in Fig. 3 of the drawing, a suitable clutch for this use may include an input member 69 which is arranged to turn with shaft 55 by means of set screw 70. A coil 71 is wound on the input member and is connected to a source of direct current through leads 72 and slip ring arrangement 73. The slip ring 73 is separated from the input member extension, upon which it is mounted, by means of an insulating sleeve 74 and from the end of the input member by a washer insulator 75. Thus, coil 71 may be energized by a direct current source when the input member is turning with shaft 55. The output member 76 of the clutch has affixed to it a gear 63 which meshes with one of the gears on shaft 62. The gear 63 is affixed to the member 76 by means of screws 77 and 78. The entire output member and gear assembly is arranged to rotate about shaft 55 by means of bearing 79. In operation when the coil 71 is energized by a direct current source, a flux is set up through the input and output members and an attractive force exerted therebetween which urges the output member 76 against the input member 69 at points 80 and 81. Thus, a direct frictional connection is provided between the input and output members and motion is transmitted therebetween.

Referring again to Fig. 2 of the drawing, it is seen that the operating coils of clutches 59, 60 and 61 are arranged to be energized through a rectifier 82 and a selector switch 83, so that only one clutch may be operative at a given time to transmit motion between shaft 55 and shaft 62. Each of the gear trains associated with the clutches has a different gear ratio. Thus, gears 63 and 66 associated with clutch 59 have a different ratio than gears 64 and 67 associated with clutch 60 and gears 65 and 68 associated with clutch 61. The selection of the proper gear ratios is determined in large part by the characteristics of the strain following instruments employed, and is generally matched thereto. The shaft 62 is connected to the chart-holding drum 29 by means of gears 84 and 85 which complete the operative connection between the drum and the output shaft of motor 35. It may thus be seen that a different motion transmission ratio may be provided between the shaft of motor 35 and the chart-holding drum 29 depending upon which of the clutches 59, 60 and 61 is energized by the selector switch 83.

In operation, when it is desired to vary the strain magnification for a particular section of the stress strain diagram, it is merely necessary for the operator to move selector switch 83 to the position affording the desired motion transmission ratio. By this means, the chart-holding drum 29 may be made to move a greater or lesser distance for a given change in the output signal from strain following instrument 26 without materially interrupting the test under progress. If desired, a strain following instrument having a different range may also be employed when the change in strain magnification is made.

It should be understood that variations may be made in the details of construction without departing from the spirit of the invention, except as defined in the appended claims.

What is claimed is:

1. In a stress-strain recording apparatus having recording means with two members movable with respect to each other to produce a stress-strain diagram, and stress responsive means connected to one of said members for movement thereof; the combination comprising strain responsive means having an output proportional to the strain being measured; signal transmitting means connected to the output of said strain responsive means and producing mechanical motion at its output in response to changes in the output from said strain responsive means; a first rotatable shaft connected to the output of said signal transmitting means for rotation thereby; a plurality of electromagnetically operated clutches each having an operating coil and input and output members, each of said clutches having its input member mounted on said first shaft for rotation therewith and having a driving gear mounted on its output member for rotation therewith; a second rotatable shaft connected to the other of said two members of the recording means for movement thereof and having a plurality of driven gears mounted thereon for rotation therewith, each of said driven gears continuously meshing with one of the driving gears mounted on the output members of said clutches to form a plurality of separate gear trains each having a different gear ratio; and a selector switch connected between a source of energizing current and each of the operating coils of said clutches, said switch being operable to energize only one of said operating coils at a time, whereby strain magnification may be selectively controlled during the course of the test.

2. In a stress-strain recording apparatus having recording means with a rotatable chart holding drum and a stylus movable along the surface of said drum in a path substantially parallel to the axis of rotation of said drum, said drum and stylus cooperating to produce a stress-strain diagram, and stress responsive means connected to said stylus for movement thereof; the combination comprising strain responsive means having an output proportional to the strain being measured; a first differential transformer connected to said strain responsive means for actuation thereby; electric motor means; a second differential transformer connected to said motor means for actuation thereby; amplifier means having its input connected to receive the signals produced by said first and second differential transformers and its output connected to reversibly control said motor means; a first rotatable shaft connected to said motor means for rotation thereby; a plurality of electromagnetically operated clutches each having an operating coil and input and output members, each of said clutches having its input member mounted on said first shaft for rotation therewith and having a driving gear mounted on its output member for rotation therewith; a second rotatable shaft connected to said drum for rotation thereof and having a plurality of driven gears mounted thereon for rotation therewith, each of said driven gears continuously meshing with one of the driving gears mounted on the output members of said clutches to form a plurality of separate gear trains each having a different gear ratio; and a selector switch connected between a source of energizing current and each of the operating coils of said clutches, said switch being operable to energize only one of said operating coils at a time, whereby strain magnification may be selectively controlled during the course of the test.

References Cited in the file of this patent

UNITED STATES PATENTS

| | | |
|---|---|---|
| 2,014,357 | Klemperer | Sept. 10, 1935 |
| 2,339,976 | Brown | Jan. 25, 1944 |
| 2,445,683 | MacGeorge | July 20, 1948 |
| 2,593,493 | Schlachman et al. | Apr. 22, 1952 |
| 2,630,970 | Cradduck | Mar. 10, 1953 |
| 2,647,411 | Filocano | Aug. 4, 1953 |